(12) United States Patent
Ko (10) Patent No.: US 11,057,776 B2
(45) Date of Patent: Jul. 6, 2021

(54) DEVICE IDENTIFYING METHOD, IDENTIFYING DEVICE, AND DEVICE PAIRING METHOD

(71) Applicant: MEDIATEK INC., Hsin-Chu (TW)

(72) Inventor: Li-Chun Ko, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 364 days.

(21) Appl. No.: 16/243,082

(22) Filed: Jan. 9, 2019

(65) Prior Publication Data
US 2019/0215687 A1   Jul. 11, 2019

Related U.S. Application Data

(60) Provisional application No. 62/616,040, filed on Jan. 11, 2018.

(51) Int. Cl.
| | |
|---|---|
| *H04W 12/55* | (2021.01) |
| *H04W 8/00* | (2009.01) |
| *H04W 4/80* | (2018.01) |
| *H04W 76/10* | (2018.01) |
| *H04L 9/30* | (2006.01) |
| *H04W 12/06* | (2021.01) |

(52) U.S. Cl.
CPC .............. *H04W 12/55* (2021.01); *H04L 9/30* (2013.01); *H04W 4/80* (2018.02); *H04W 8/005* (2013.01); *H04W 12/06* (2013.01); *H04W 76/10* (2018.02); *H04L 2209/34* (2013.01)

(58) Field of Classification Search
CPC ....... H04W 12/55; H04W 12/06; H04W 4/80; H04W 76/10; H04W 8/005; H04L 9/30; H04L 2209/34

USPC .......................................................... 713/168
See application file for complete search history.

(56) References Cited

U.S. PATENT DOCUMENTS

| | | | | |
|---|---|---|---|---|
| 6,801,998 B1 * | 10/2004 | Hanna | .................. | H04L 63/045 |
| | | | | 713/155 |
| 7,567,510 B2 * | 7/2009 | Gai | ..................... | H04L 12/4645 |
| | | | | 370/230 |
| 2003/0056114 A1 * | 3/2003 | Goland | ................. | H04L 9/3263 |
| | | | | 726/5 |
| 2008/0091941 A1 * | 4/2008 | Yonezawa | ............. | H04L 9/3255 |
| | | | | 713/158 |

(Continued)

FOREIGN PATENT DOCUMENTS

| | | |
|---|---|---|
| CN | 107667515 A | 2/2018 |
| TW | 201902258 A | 1/2019 |
| WO | 2015/164710 A1 | 10/2015 |

*Primary Examiner* — Michael S McNally
(74) *Attorney, Agent, or Firm* — Winston Hsu (57) ABSTRACT

A device identifying method for identifying whether a candidate member device belongs to a device set or not by an identifying device. The device set comprising at least one member device. The method comprises: (a) establishing a connection between the identifying device and a first member device among the member device, to acquire a set ID and at least one identifying key from the first member device; (b) discovering the candidate member device according to the set ID; (c) generating identifying data according to the identifying key and transmitting the identifying data to the candidate member device; and (d) determining whether the candidate member device belongs to the device set or not according to a comparing result for the identifying data.

21 Claims, 9 Drawing Sheets

(56) References Cited

U.S. PATENT DOCUMENTS

| | | | |
|---|---|---|---|
| 2008/0253562 A1* | 10/2008 | Nyberg | H04L 9/0833 |
| | | | 380/30 |
| 2008/0270790 A1* | 10/2008 | Brickell | G06F 21/57 |
| | | | 713/158 |
| 2009/0129600 A1* | 5/2009 | Brickell | H04L 9/3218 |
| | | | 380/282 |
| 2011/0110522 A1* | 5/2011 | Kwon | H04L 63/061 |
| | | | 380/270 |
| 2014/0323049 A1* | 10/2014 | Park | H04W 76/10 |
| | | | 455/41.2 |
| 2016/0085960 A1* | 3/2016 | Priev | H04W 12/50 |
| | | | 726/7 |
| 2016/0112408 A1* | 4/2016 | Everhart | H04L 9/3247 |
| | | | 713/156 |

* cited by examiner

DEVICE IDENTIFYING METHOD, IDENTIFYING DEVICE, AND DEVICE PAIRING METHOD

CROSS REFERENCE TO RELATED APPLICATIONS

This application claims the benefit of U.S. Provisional Application No. 62/616,040, filed on 2018 Jan. 11, the contents of which are incorporated herein by reference.

BACKGROUND

Short distance wireless communication algorithms such as Bluetooth are very popular in recent years. Such algorithms can easily establish a connection between two different devices. However, the pairing method for these algorithms may have some disadvantages.

Figure 1:
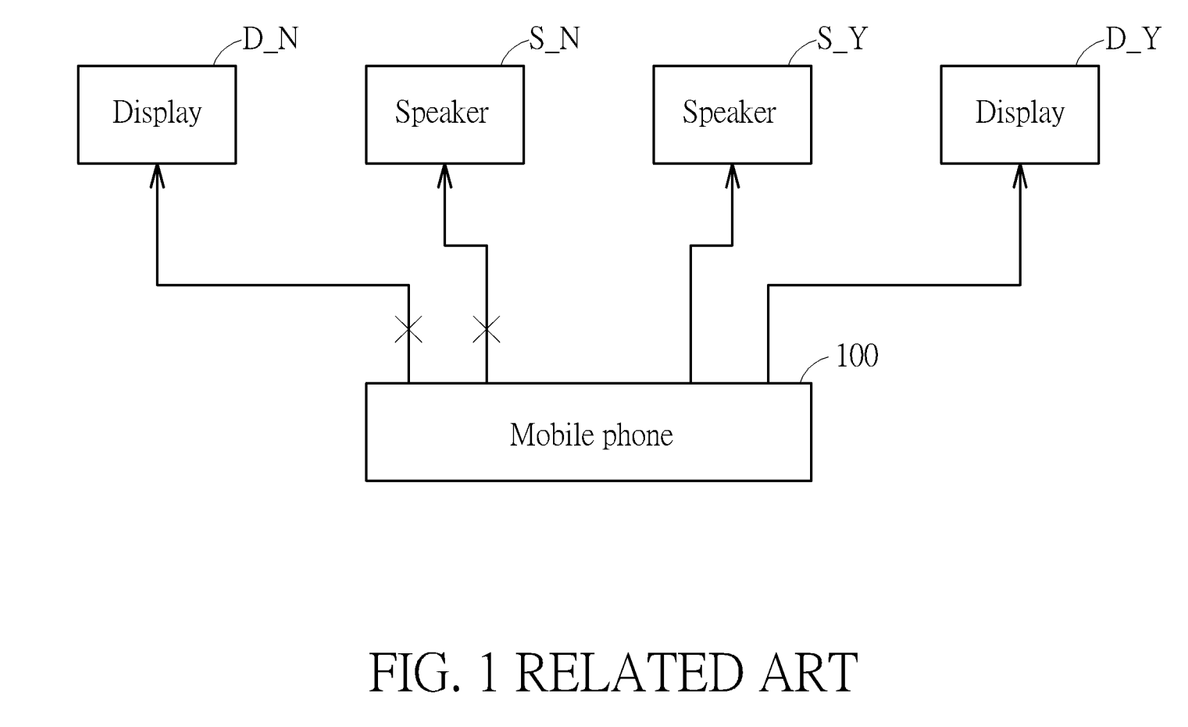
FIG. 1 is a schematic diagram illustrating operations of a related Bluetooth device pairing method.

FIG. 1 is a schematic diagram illustrating operations of a related Bluetooth device pairing method. As illustrated in FIG. 1, if the mobile phone 100 wants to pair with a plurality of other devices such as a speaker S_Y and a display D_Y, the mobile phone 100 must pair with the speaker S_Y and the display D_Y one by one. The whole process for pairing must be repeated for each paired device, thus wastes a lot of time if the user wants to pair the mobile phone 100 with a plurality of devices.

Besides, as illustrated in FIG. 1, the user may pair the mobile phone 100 to a wrong device such as the speaker S_N or the display D_N while pairing to the speaker S_Y and the display D_Y, thus data stored in the mobile phone 100 may be played on other peoples' devices. Even the worse, the data stored in the mobile phone 100 may be stolen if it is paired with a wrong device.

SUMMARY

One objective of the present application is to provide a device identifying method and an identifying device which can identify whether a candidate member device belongs to a device set or not by an identifying device.

On objective of the present application is providing a device identifying method for identifying whether a candidate member device belongs to a device set or not by an identifying device. The device set comprising at least one member device. The method comprises: (a) establishing a connection between the identifying device and a first member device among the member device, to acquire a set ID and at least one identifying key from the first member device; (b) discovering the candidate member device according to the set ID; (c) generating identifying data according to the identifying key and transmitting the identifying data to the candidate member device; and (d) determining whether the candidate member device belongs to the device set or not according to a comparing result for the identifying data.

Another objective of the present application is providing an identifying device can identify whether a candidate member device belongs to a device set or not, the device set comprising at least one member device, comprising: a processing circuit, configured to execute at least one program code to perform: (a) establishing a connection between the identifying device and a first member device among the member device, to acquire a set ID and at least one identifying key from the first member device; (b) discovering the candidate member device according to the set ID; (c) generating identifying data according to the identifying key and transmitting the identifying data to the candidate member device; and (d) determining whether the candidate member device belongs to the device set or not according to a comparing result for the identifying data.

Still another objective of the present application is providing a device pairing method, for determining whether an identifying device should be paired with a candidate member device or not, the method comprising: (a) establishing a connection between the identifying device and a first member device among at least one member device of a device set, to acquire a set ID and at least one identifying key from the first member device; (b) discovering the candidate member device according to the set ID; (c) generating identifying data according to the identifying key and transmitting the identifying data to the candidate member device; (d) determining whether the candidate member device belongs to the device set or not according to a comparing result for the identifying data; and (e) pairing the identifying device to the candidate member device when the candidate member device belongs to the device set and not pairing the identifying device to the candidate member device when the candidate member device does not belong to the device set.

In view of above-mentioned embodiments, the member device can be easily found and can be strictly authenticated before pairing, such that the user can make sure his device is paired with a reliable device.

These and other objectives of the present application will no doubt become obvious to those of ordinary skill in the art after reading the following detailed description of the preferred embodiment that is illustrated in the various figures and drawings.

DETAILED DESCRIPTION

In following descriptions, several embodiments are provided to explain the concept of the present application. Please note, each component in the embodiment can be implemented as hardware (e.g. a circuit or an apparatus) or firmware (e.g. a processor installed with at least one program). Also, the component in each embodiment can be separated to more components or be integrated to fewer components. Additionally, the term "first", "second" . . . in the specification are only for indicating the components or the steps are different ones but do not mean the sequence thereof.

Figure 2:
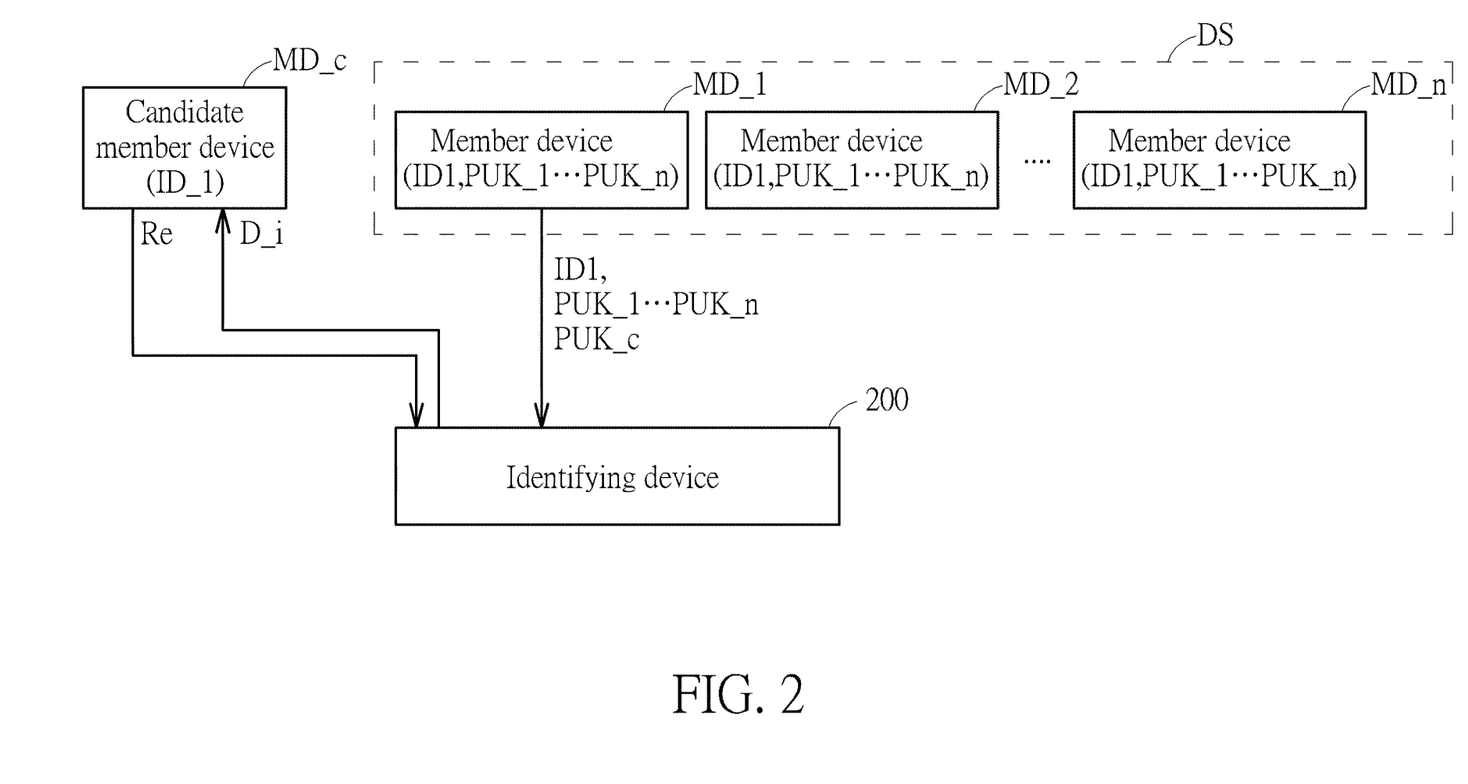
FIG. 2 is a schematic diagram illustrating operations of a device paring method according to one embodiment of the present application.

FIG. 2 is a schematic diagram illustrating operations of a device paring method according to one embodiment of the present application. As illustrated in FIG. 2, the device set DS comprises at least one member device. In this embodiment, more than one member devices MD_1, MD_2 . . . MD_n are included in the device set DS. The member devices MD_1, MD_2 . . . MD_n can be any kind of device, such as a speaker, a display, a television, a mobile phone, a laptop, or a tablet computer. The member devices MD_1, MD_2 . . . MD_n of the device set DS comprise the same set ID (ID_1 in this example). Besides, the member devices MD_1, MD_2 . . . MD_n of the device set DS respectively comprises different set public keys for itself. For example, the member device MD_1 comprises the set public key PUK_1, the member device MD_2 comprises the set public key PUK_2 and the member device MD_n comprises the set public key PUK_n. Furthermore, each of the member devices MD_1, MD_2 . . . MD_n also comprises set public keys for other member devices. In other words, each of the member devices MD_1, MD_2 . . . MD_n comprises all the set public keys PUK_1 . . . PUK_n.

The identifying device 200 is applied to perform a device identifying method disclosed in the present application. The identifying device 200 can be any device which can perform the device identifying method, such as a smart watch, a mobile phone, a laptop, or a tablet computer. Before finding a device to be identified, which is named a candidate member device herein after, the identifying device 200 establishes a connection between the identifying device 200 and a member device among the member devices MD_1, MD_2 . . . MD_n (MD_1 in this embodiment). After the connection is established, the identifying device 200 acquires the set ID ID_1 and set public keys PUK_1 . . . PUK_n for each of the member devices MD_1, MD_2 . . . MD_n from the member device MD_1. In other words, the identifying device 200 acquires the set ID ID_1 and the set public keys PUK_1, PUK_2 . . . PUK_n from the member device MD_1. Besides the set ID ID_1 and the set public keys PUK_1, PUK_2 . . . PUK_n, the identifying device 200 can also acquire other set information such member device addresses from the member device MD_1.

After receiving the set public keys PUK_1, PUK_2 . . . PUK_n, the identifying device 200 discovers the candidate member device MD_C according to the set ID ID_1. The candidate member device MD_C belongs to the device set DS but is not paired with the identifying device 200 yet. Therefore, the candidate member device MD_C also comprises the set ID ID_1 such that the identifying device 200 can discover it. After discovering the candidate member device MD_C, the identifying device 200 generates identifying data D_i according to the set public key PUK_c for the candidate member device MD_C and transmits the identifying data D_i to the candidate member device MD_c. If the candidate member device MD_C is a member device of the device set DS, the member device MD_1 also comprises the set public key PUK_c and the identifying device 200 can acquire the set public key PUK_c from the member device MD_1. Next, the identifying device 200 determines whether the candidate member device MD_c belongs to the device set DS or not according to comparing result Re from the candidate member device MD_c for the identifying data D_i. Detail steps will be described in following descriptions.

Figure 3:
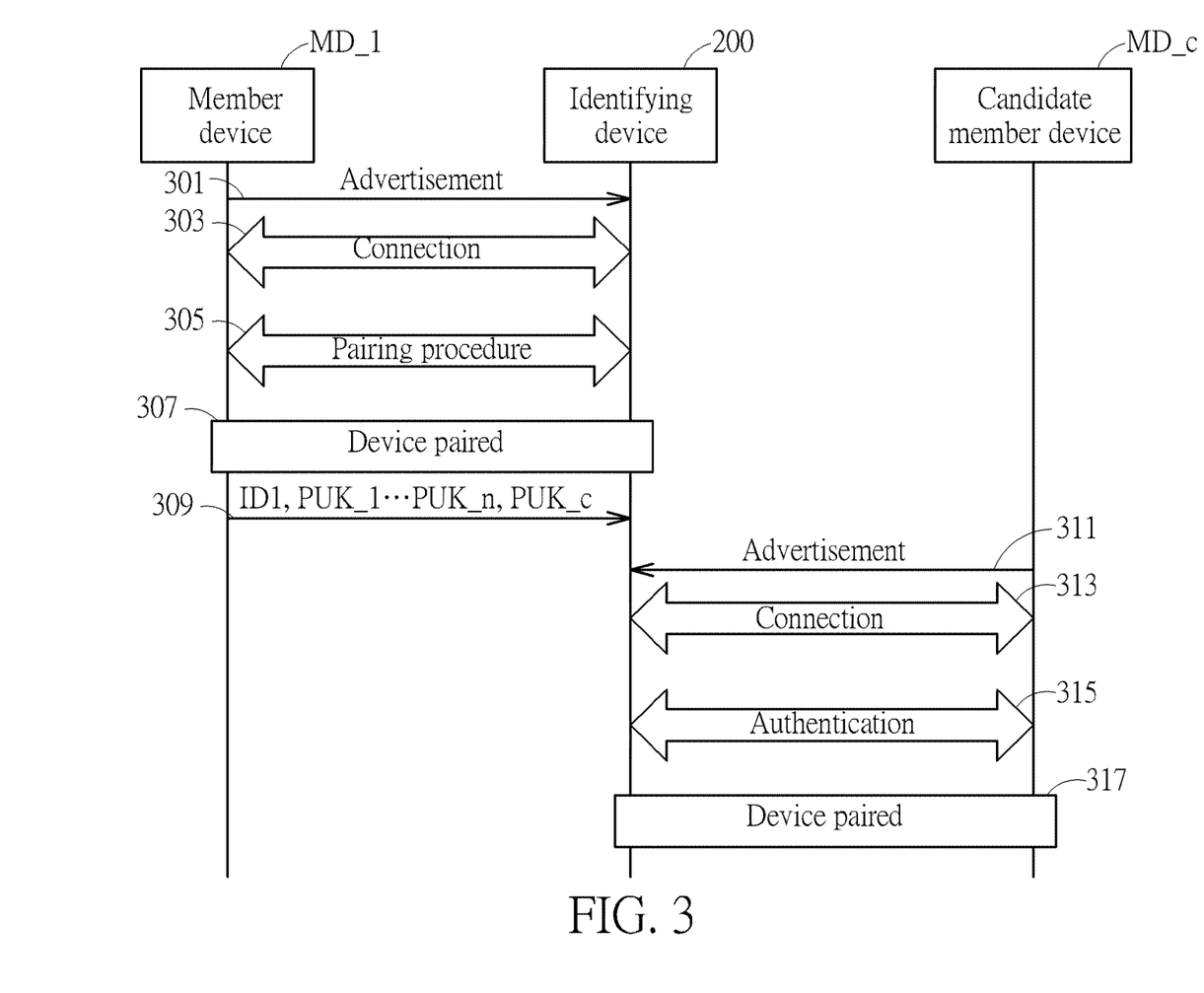
FIG. 3 is a schematic diagram illustrating steps of a device paring method according to one embodiment of the present application.

FIG. 3 is a schematic diagram illustrating steps of a device paring method according to one embodiment of the present application. As illustrated in FIG. 3, the member device MD_1 generates advertisements of the device set DS in the step 301, such that the identifying device 200 can generate a connection to the member device MD_1 in the step 303. In one embodiment, the connection is a LESC (Low Energy Secure Connection). In the step 305, the identifying device 200 performs a pairing procedure such as a Bluetooth pairing procedure, such that the identifying device 200 and the member device MD_1 can be paired in the step 307. Next, in the step 309, the identifying device 200 acquires the set ID ID_1 and the set public keys PUK_1, PUK_2 . . . PUKn and the set public key PUK_c from the member device MD_1.

In the step 311, the candidate member device MD_c generates advertisements of the device set DS such that the identifying device 200 can discover the candidate member device MD_c and establishes a connection to the candidate member device MD_c in the step 313. In one embodiment, the connection is a LESC. After the connection is established, the identifying device 200 performs authentication in the step 315 to identify whether the candidate member device MD_c belongs to the device set DS or not. If the authentication is not performed, a device stealing or copying the set ID ID_1 will be determined as a member device of the device set DS and can be paired with the identifying device 200. If the authentication in the step 315 is passed, the candidate member device MD_c is determined as a member device of the device set DS, such that the identifying device 200 can pair with the candidate member device MD_c in the step 317.

In one embodiment, the authentication in the step 315 is performed referring to OOB (out of band) authentication for Bluetooth pairing. More specifically, the identifying device 200 applies the set public key PUB_c to encode data generated referring to the OOB authentication to generate the above-mentioned identifying data D_i. The term "refer" means following partial steps of the OOB authentication rather than all steps of the OOB authentication. In other words, the authentication in the step 315 is performed based on a modified OOB authentication provided by the present application rather than an original OOB authentication.

Figure 4:
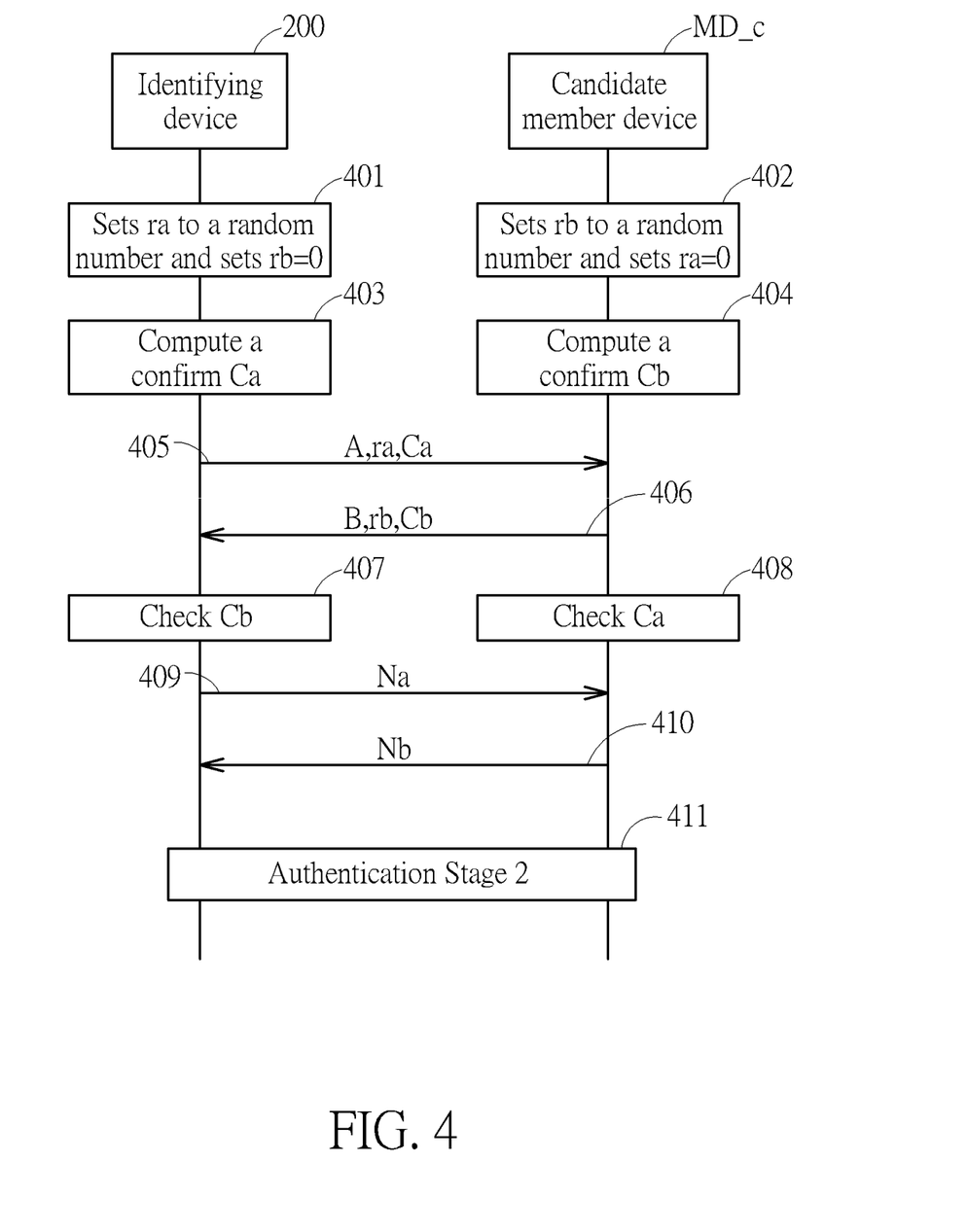
FIG. 4 is a flow chart illustrating steps of an original OOB authentication for Bluetooth pairing.

FIG. 4 is a flow chart illustrating steps of an original OOB authentication for Bluetooth pairing. The steps in FIG. 4 comprise:

Step 401:

The identifying device 200 sets ra to a random number and sets rb=0.

Step 402:

The candidate member device MD_c sets rb to a random number and sets ra=0.

Step 403

The identifying device 200 computes a confirm Ca by a function Ca=f4 (Pka, Pkb, ra, 0). The Pka is a public key of the identifying device 200 and the Pkb is a public key of the candidate member device MD_c. The PKa and the PKb are exchanged before the OOb authentication begins. Please note, the PKa and the PKb are independent from the above-mentioned set public keys and are not related with the device set DS.

Step 404

The candidate member device MD_c computes a confirm Cb by a function Cb=f4(Pka, Pkb, rb, 0).

Step 405

The identifying device 200 sends A, the random number ra and the confirm Ca to the candidate member device MD_c. The A is an address of the identifying device 200.

Step 406

The candidate member device MD_c sends B, the random number rb and the confirm Cb to the identifying device 200. The B is an address of the candidate member device MD_c.

Step 407

The identifying device 200 also computes a confirm Cb by a function Cb=f4 (Pka, Pkb, rb, 0). This Cb and the received Cb are checked whether they are the same or not. If yes, continue following steps, if not, abort (authentication failed).

Step 408

The candidate member device MD_c also computes a confirm Ca by a function Ca=f4(Pka,Pkb, ra, 0). This Ca and the received Ca are checked whether they are the same or not. If yes, continue following steps, if not, abort (authentication failed).

Step 409

The identifying device 200 selects a random number Na and sends the random number Na to the candidate member device MD_c.

Step 410

The candidate member device MD_c selects a random number Nb and sends the random number Nb to the identifying device 200.

Step 411

The Authentication Stage 2 is performed. Briefly, long terms keys are generated according to the random numbers ra, rb, Na and NB, and authentication is performed based on the long terms keys. Other details are defined in the spec of the OOC authentication for Bluetooth pairing, thus other details are omitted for brevity.

If the authentication passes, the candidate member device MD_c can be paired with the identifying device 200. On the contrary, the candidate member device MD_c could not be paired with the identifying device 200.

Figure 5:
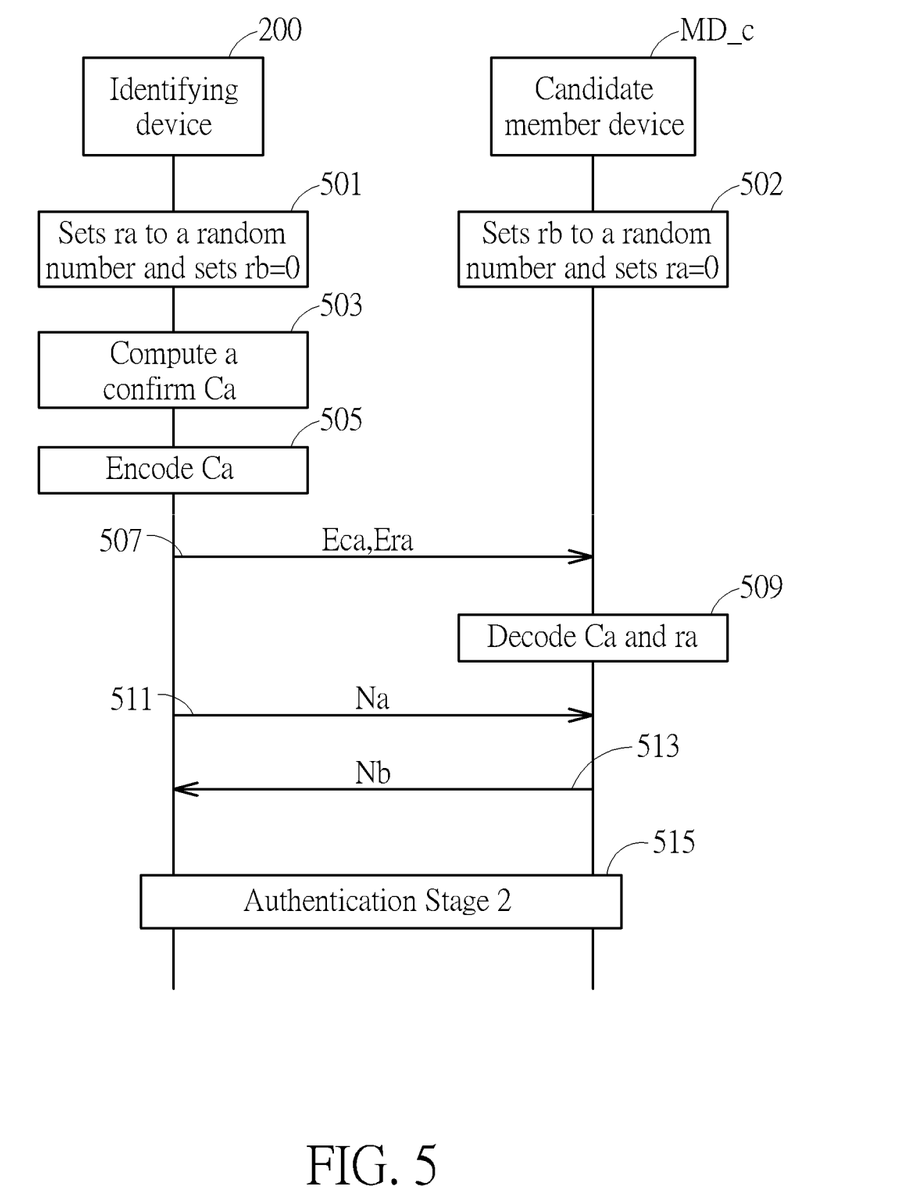
FIG. 5 is a flow chart illustrating steps of a modified OOB authentication for Bluetooth pairing according to one embodiment of the present application.

FIG. 5 is a flow chart illustrating steps of a modified OOB authentication for Bluetooth pairing according to one embodiment of the present application. The above-mentioned identifying data D_i is generated based on the modified OOB authentication. Steps in FIG. 5 comprise:

Step 501:

The identifying device 200 sets ra to a random number and sets rb=0.

Step 502:

The candidate member device MD_c sets rb to a random number and sets ra=0.

Step 503

The identifying device 200 computes a confirm Ca by a function Ca=f4(Pka,Pkb, ra, 0). The Pka is a public key of the identifying device 200 and the Pkb is a public key of the candidate member device MD_c. The PKA and the PKb are exchanged before the OOb authentication begins. Please note, the PKa and the PKb are independent from the above-mentioned set public keys and are not related with the device set DS.

Step 505

The identifying device 200 encodes the confirm Ca by the set public key Pub_c of the candidate member device MD_c to generate encoded confirm. ECa. Besides, the identifying device 200 encodes the random number ra to generate an encoded random number Era. The encoded confirm ECa and the encoded random number Era are the above-mentioned identifying data D_i.

Step 507

The identifying device 200 sends the identifying data Era and ECa to the candidate member device MD_c.

Besides the confirm Ca and the random number ra are encoded, the above-mentioned A (the address of the identifying device 200) can also be encoded by the set public key Pub_c of the candidate member device MD_c to generate the identifying data EA.

Step 509

The candidate member device MD_c also computes a confirm Ca by a function Ca=f4(Pka,Pkb, ra, 0). Besides, the candidate member device MD_c decodes the identifying data ECa by the set public key Pub_c to generated decoded identifying data ECa.

If the confirm Ca generated by the candidate member device MD_c and the decoded identifying data ECa are the same, following steps are performed. If not, the authentication fails.

If the candidate member device MD_c is really the desired member device, it also has the set public key Pub_c thus the confirm Ca generated by the candidate member device MD_c and the decoded identifying data ECa are the same. On the opposite, if the candidate member device MD_c is not the desired member device, it does not have the set public key Pub_c thus the confirm Ca generated by the candidate member device MD_c and the decoded identifying data ECa are different.

Similarly, the candidate member device MD_c decodes the identifying data Era by the set public key Pub_c to generated decoded identifying data Era. The decoded identifying data Era will be applied to generate the long term key in following steps, thus the authentication does not pass if the candidate member device MD_c does not have the set public key Pub_c.

Step 511

The identifying device 200 selects a random number Na and sends the random number Na to the candidate member device MD_c.

Step 513

The candidate member device MD_c selects a random number Nb and sends the random number Nb to the identifying device 200.

Step 515

The Authentication Stage 2 is performed. Briefly, long terms keys are generated according to the random numbers ra, rb, Na and NB, and authentication is performed based on the long terms keys. Other details are defined in the spec of the OOC authentication for Bluetooth pairing, thus other details are omitted for brevity.

If the authentication passes, the candidate member device MD_c can be paired with the identifying device 200. On the contrary, the candidate member device MD_c could not be paired with the identifying device 200.

The embodiment illustrated in FIG. 5 can be summarized as follows: the step of generating the identifying data D_i according to the set public key Pub_c of the candidate member device MD_c comprises: selecting a random number (e.g. the random number ra in the step 501); applying a specific function (e.g. the f4 function in the step 503) to generate confirm data (e.g. the confirm Ca in the step 503) according to a public key of the identifying device, a public key of the candidate member device, and the random number; and encoding the confirm data and the random number by the set public key of the candidate member device to generate the identifying data.

Comparing the steps in FIG. 4 and the steps in FIG. 5, the modified OOB authentication in FIG. 5 does not comprises the step of computing a confirm Cb (step 404), thus related steps such as the step 407 is not performed. However, these steps can also be included in the modified OOB authentication.

Figure 6:
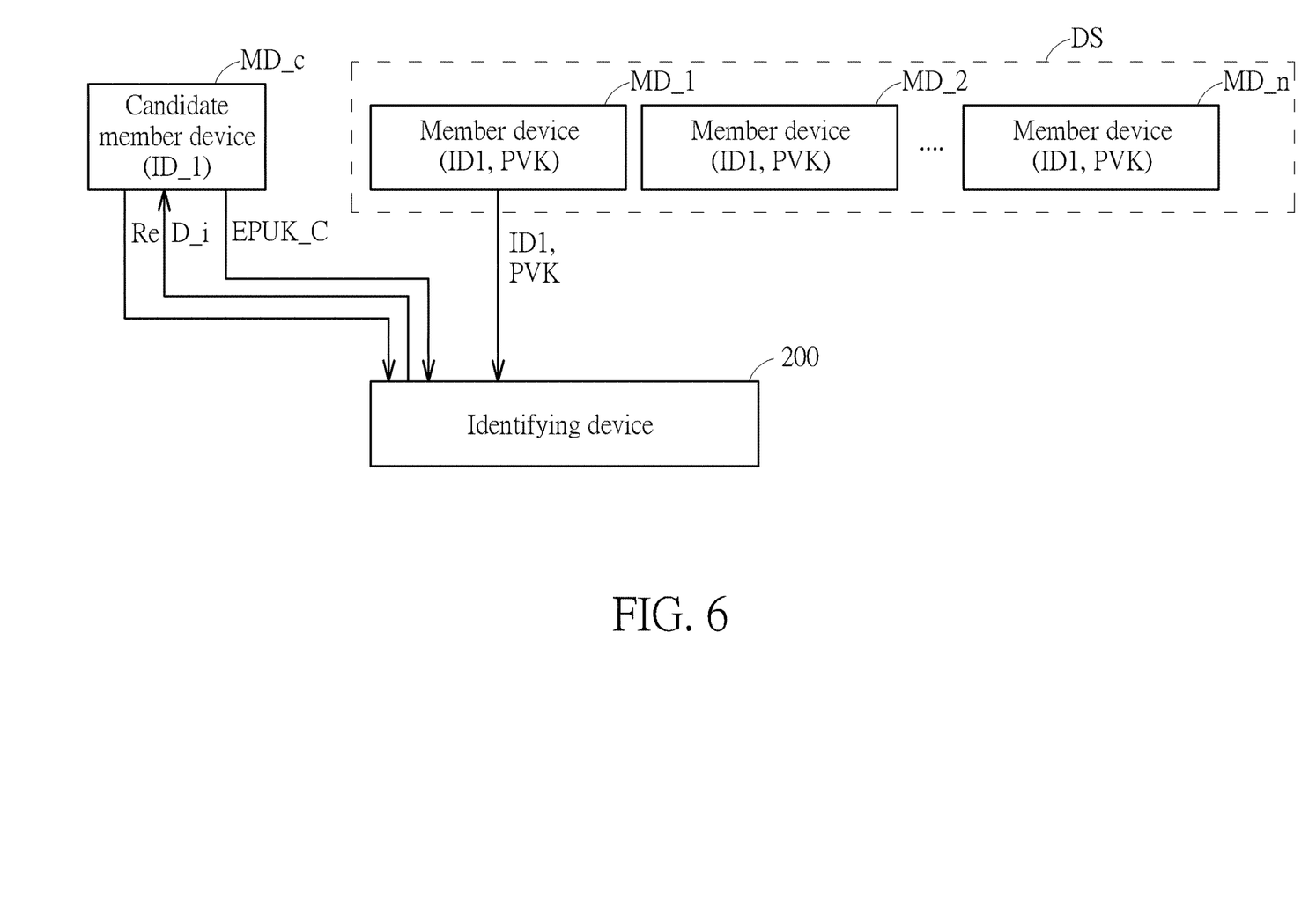
FIG. 6 is a schematic diagram illustrating operations of a device paring method according to another embodiment of the present application.

FIG. 6 is a schematic diagram illustrating operations of a device paring method according to another embodiment of the present application. As illustrated in FIG. 6, the device set DS comprises at least one member device. In this embodiment, more than one member devices MD_1, MD_2 . . . MD_n are included in the device set DS. The member devices MD_1, MD_2 . . . MD_n can be any kind of device, such as a speaker, a display, a television, a mobile phone, a laptop, or a tablet computer. The member devices MD_1, MD_2 . . . MD_n of the device set DS comprise the same set ID (ID_1 in this example). Besides, each of the member devices MD_1, MD_2 . . . MD_n comprises a set privacy key PVK.

The identifying device 200 is applied to perform a device identifying method disclosed in the present application. The identifying device 200 can be any device which can perform the device identifying method, such as a smart watch, a mobile phone, a laptop, or a tablet computer. Before finding a device to be identified, which is named a candidate member device herein after, the identifying device 200 establishes a connection between the identifying device 200 and a member device among the member devices MD_1, MD_2 . . . MD_n (MD_1 in this embodiment). After the connection is established, the identifying device 200 acquires the set ID ID_1 and the set privacy key PVK from the member device MD_1. Besides the set ID ID_1 and the set privacy key PVK, the identifying device 200 can also acquire other set information such member device addresses from the member device MD_1.

After receiving the set privacy key PVK, the identifying device 200 discovers the candidate member device MD_C according to the set ID ID_1. The candidate member device MD_C belongs to the device set DS but is not paired with the identifying device 200 yet. Therefore, the candidate member device MD_C also comprises the set ID ID_1 such that the identifying device 200 can discover it. After discovering the candidate member device MD_C, the identifying device 200 receives an encoded set public key EPUK_c from the candidate member device MD_C. The encoded set public key EPUK_c is generated by encoding a set public key PUK_c of the candidate member device MD_C by the set privacy key PVK. After receiving the encoded set public key EPUK_c, the identifying device 200 decodes the encoded set public key EPUK_c by the set privacy key PVK to acquire the set public key PUK_c. If the candidate member device MD_C is a member device of the device set DS, it has the set privacy key PVK thus the identifying device 200 can acquire the correct set public key PUK_c via decoding the encoded set public key EPUK_c by the set privacy key PVK.

Next, the identifying device 200 generates identifying data D_i according to the set public key PUK_c for the candidate member device MD_C and transmits the identifying data D_i to the candidate member device MD_c. If the candidate member device MD_C is a member device of the device set DS, the member device MD_1 also comprises the set public key PUK_c. Next, the identifying device 200 determines whether the candidate member device MD_c belongs to the device set DS or not according to comparing result Re from the candidate member device MD_c for the identifying data D_i. Detail steps will be described in following descriptions.

Figure 7:
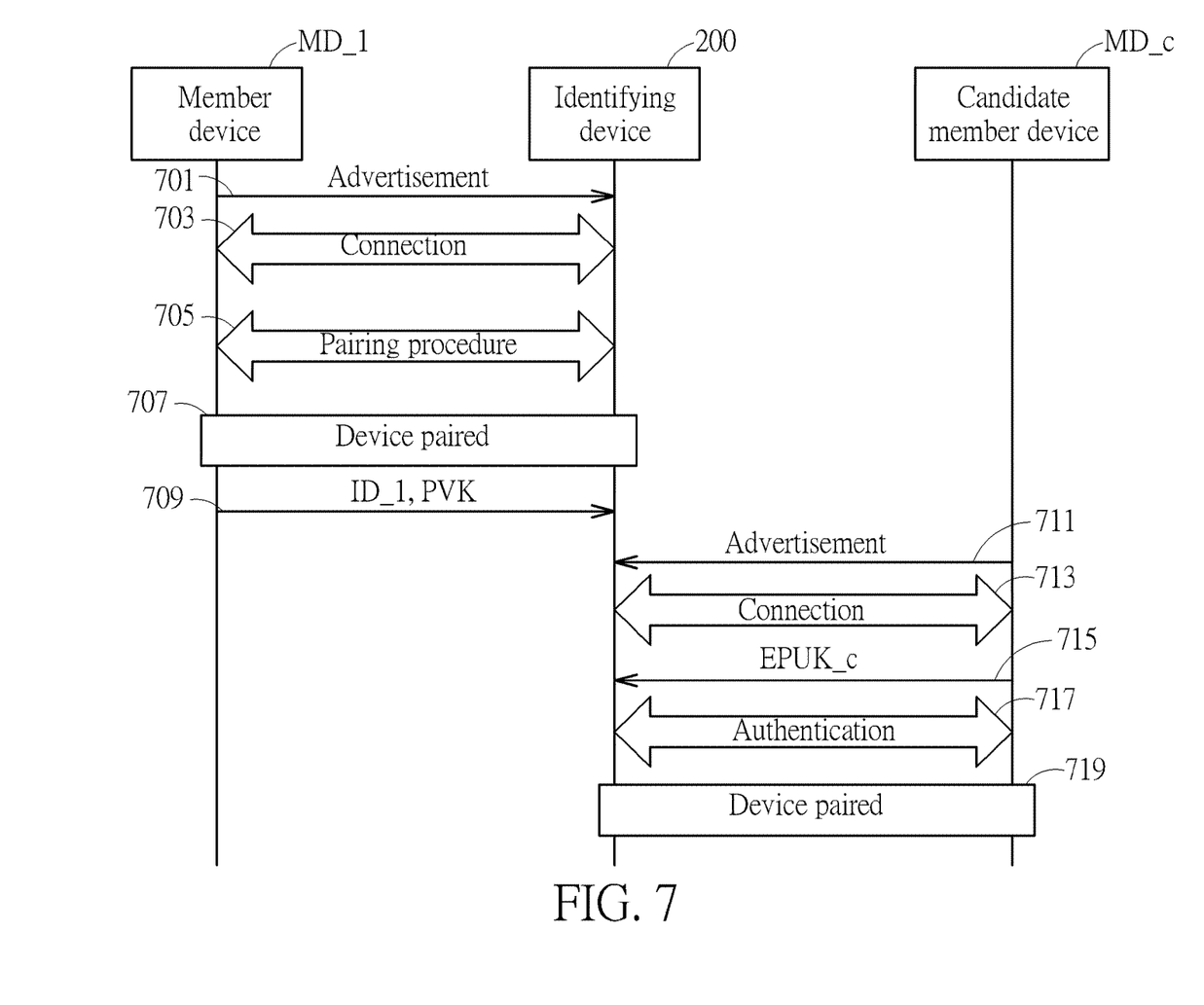
FIG. 7 is a schematic diagram illustrating steps of a device paring method according to another embodiment of the present application.

FIG. 7 is a schematic diagram illustrating steps of a device paring method according to one embodiment of the present application. As illustrated in FIG. 7, the member device MD_1 generates advertisements of the device set DS (step 701) such that the identifying device 200 can generate a connection to the member device MD_1 in the step 703. In one embodiment, the connection is a LESC (Low Energy Secure Connection). In the step 705, the identifying device 200 performs a pairing procedure such as a Bluetooth pairing procedure, such that the identifying device 200 and the member device MD_1 can be paired in the step 707. Next, in the step 709, the identifying device 200 acquires the set ID ID_1 and the set privacy key PVK from the member device MD_1.

In the step 711, the candidate member device MD_c generates advertisements of the device set DS such that the identifying device 200 can discover the candidate member device MD_c and establishes a connection to the candidate member device MD_c in the step 713. In one embodiment, the connection is a LESC. After the connection is established, the identifying device 200 receives the encoded set public key EPUK_c from the candidate member device MD_c and decodes the encoded set public key EPUK_c by the set privacy key PVK to acquire the set public key PUK_c (step 715).

Afterwards, performs authentication in the step 717 to identify whether the candidate member device MD_c belongs to the device set DS or not. If the authentication is not performed, a device stealing or copying the set ID ID_1 will be determined as a member device of the device set DS and can be paired with the identifying device 200. If the authentication in the step 717 is passed, the candidate member device MD_c is determined as a member device of the device set DS, such that the identifying device 200 can pair with the candidate member device MD_c in the step 719.

In one embodiment, the authentication in the step 717 is performed referring to OOB (out of band) authentication for Bluetooth pairing. More specifically, the identifying device 200 applies the set public key PUB_c to encode data generated referring to the OOB authentication to generate the above-mentioned identifying data D_i. The term "refer" means following partial steps of the OOB authentication rather than all steps of the OOB authentication. In other words, the authentication in the step 717 can be performed based on a modified OOB authentication provided by the present application rather than an original OOB authentication.

In one embodiment, the identifying data D_i is performed following the steps illustrated in the embodiment of FIG. 5. That is, the identifying data D_i can be the encoded confirm ECa in the step 507. Detail operations are illustrated in above-mentioned descriptions, thus are omitted for brevity here.

In view of above-mentioned embodiments, a device identifying method can be acquired. The device identifying method can identify whether a candidate member device MD_c belongs to a device set DS or not by an identifying device 200. The device identifying method can be applied for device pairing method and comprises the following steps in FIG. 8:

Step 801

Figure 8:
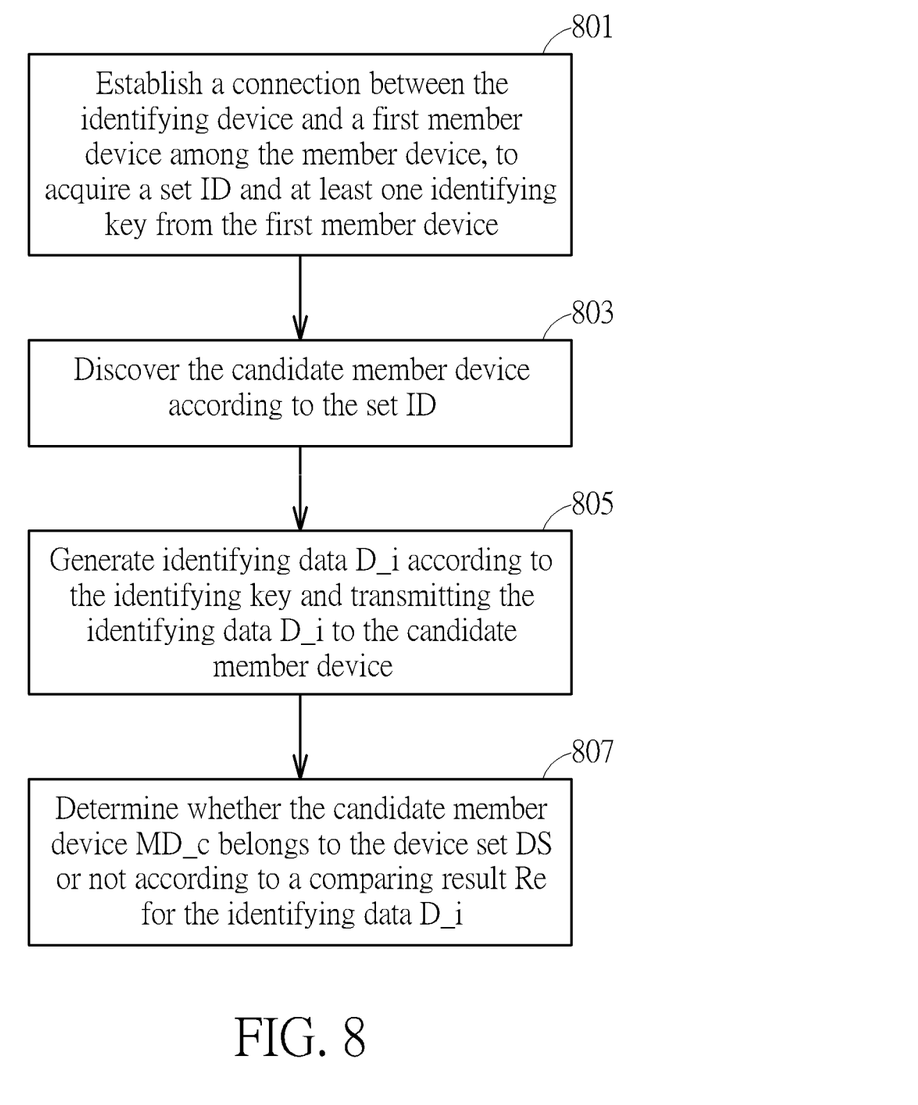
FIG. 8 is a flowchart illustrating a device identifying method according to embodiments of the present application.

Establish a connection between the identifying device and a first member device among the member device (e.g. the member device MD_1 in FIG. 2), to acquire a set ID (e.g. the set ID ID_1 in FIG. 2) and at least one identifying key from the first member device.

The identifying key can be the set public key PUK_c for the candidate member device MD_c, such as the embodiment of FIG. 2, and can be the set privacy key PVK, such as the embodiment of FIG. 6.

Step 803

Discover the candidate member device according to the set ID.

Step 805

Generate identifying data D_i according to the identifying key and transmit the identifying data D_i to the candidate member device.

The identifying data D_i can be, for example, generated by encoding the confirm Ca in the step 505 by the set public key PUK_c.

Step 807

Determine whether the candidate member device MD_c belongs to the device set DS or not according to a comparing result Re for the identifying data D_i.

The comparing result Re can be, for example, the comparing result between the confirm Ca generated by the identifying device 200 and the confirm Ca generated by the candidate member device MD_c, such as the result generated in the step 509.

Other details of the device identifying method are illustrated in above-mentioned descriptions, thus are omitted for brevity here.

Figure 9:
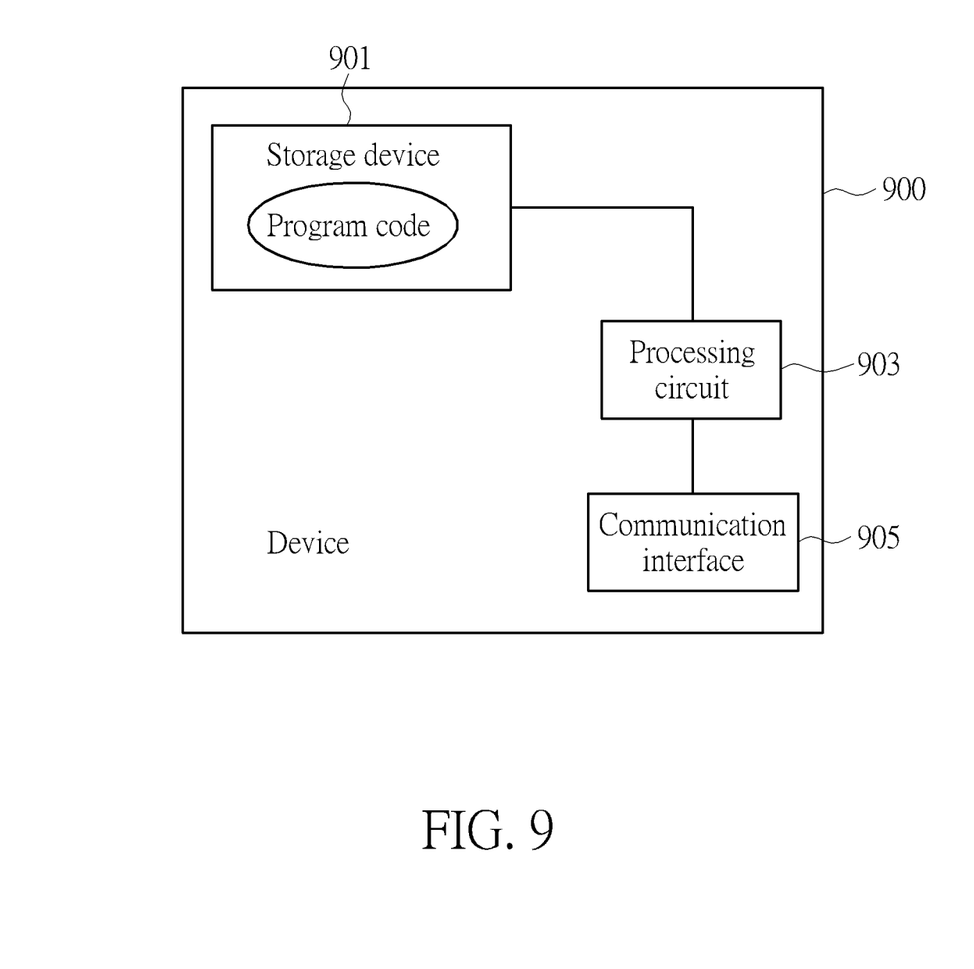
FIG. 9 is a block diagram illustrating the structures of a device according to one embodiment of the present application.

FIG. 9 is a block diagram illustrating the structures of a device according to one embodiment of the present application, which can be applied as the above-mentioned identifying device 200, and the member device MD_1, or the candidate member device MD_c. As illustrated in FIG. 9, the device 900 comprises a storage device 901, a processing circuit 903 and a communication interface 905. The storage device 901 stores at least one program code and the processing circuit 903 executes the program code to perform above-mentioned steps. The communication device 903 is configured to transmit data and to receive data. Please, the storage device 901 can be a storage device outside the identifying device 200, such as an online hard disk, rather than limited to be provided in the device 900.

In view of above-mentioned embodiments, the member device can be easily found and can be strictly authenticated before pairing, such that the user can make sure his device is paired with a reliable device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device identifying method, for identifying whether a candidate member device belongs to a device set or not by an identifying device, the device set comprising at least one member device, the method comprising:
   (a) establishing a connection between the identifying device and a first member device among the member device, to acquire a set ID and at least one identifying key from the first member device;
   (b) discovering the candidate member device according to the set ID;
   (c) generating identifying data according to the identifying key and transmitting the identifying data to the candidate member device; and
   (d) determining whether the candidate member device belongs to the device set or not according to a comparing result for the identifying data.

2. The device identifying method of claim 1, wherein the identifying key comprises set public keys respectively for each one of the member devices, wherein the step (c) comprises:
   (e) acquiring a set public key of the candidate member device from the set public keys; and
   (f) generating the identifying data according to the set public key of the candidate member device.

3. The device identifying method of claim 2, wherein the step (f) comprises:
   selecting a random number;
   applying a specific function to generate confirm data according to a public key of the identifying device, a public key of the candidate member device, and the random number; and
   encoding the confirm data and the random number by the set public key of the candidate member device to generate the identifying data.

4. The device identifying method of claim 3, wherein the confirm data is a confirm of out of band authentication for Bluetooth pairing.

5. The device identifying method of claim 1, wherein each of the member device comprises a set privacy key for the device set and the identifying key comprises the set privacy key, wherein the step (c) comprises:
   (e) acquiring an encoded set public key of the candidate member device from the candidate member device;
   (f) decoding the encoded set public key by the set privacy key to acquire a set public key of the candidate member device; and
   (g) generating the identifying data according to the set public key of the candidate member device.

6. The device identifying method of claim 5, wherein the step (g) comprises:
   selecting a random number;
   applying a specific function to generate confirm data according to a public key of the identifying device, a public key of the candidate member device, and the random number; and
   encoding the confirm data and the random number by the set public key of the candidate member device to generate the identifying data.

7. The device identifying method of claim 6, wherein the confirm data is confirm of out of band authentication for Bluetooth pairing.

8. An identifying device can identify whether a candidate member device belongs to a device set or not, the device set comprising at least one member device, comprising:
   a processing circuit, configured to execute at least one program code to perform:
   (a) establishing a connection between the identifying device and a first member device among the member device, to acquire a set ID and at least one identifying key from the first member device;
   (b) discovering the candidate member device according to the set ID;
   (c) generating identifying data according to the identifying key and transmitting the identifying data to the candidate member device; and
   (d) determining whether the candidate member device belongs to the device set or not according to a comparing result for the identifying data.

9. The identifying device of claim 8, wherein the identifying key comprises set public keys respectively for each one of the member devices, wherein the step (c) comprises:
   (e) acquiring a set public key of the candidate member device from the set public keys; and (f) generating the identifying data according to the set public key of the candidate member device.

10. The identifying device of claim 9, wherein the step (f) comprises:
selecting a random number;
applying a specific function to generate confirm data according to a public key of the identifying device, a public key of the candidate member device, and the random number; and
encoding the confirm data and the random number by the set public key of the candidate member device to generate the identifying data.

11. The identifying device of claim 10, wherein the confirm data is a confirm of out of band authentication for Bluetooth pairing.

12. The identifying device of claim 8, wherein each of the member device comprises a set privacy key for the device set and the identifying key comprises the set privacy key, wherein the step (c) comprises:
(e) acquiring an encoded set public key of the candidate member device from the candidate member device;
(f) decoding the encoded set public key by the set privacy key to acquire a set public key of the candidate member device; and
(g) generating the identifying data according to the set public key of the candidate member device.

13. The identifying device of claim 12, wherein the step (g) comprises:
selecting a random number;
applying a specific function to generate confirm data according to a public key of the identifying device, a public key of the candidate member device, and the random number; and
encoding the confirm data and the random number by the set public key of the candidate member device to generate the identifying data.

14. The identifying device of claim 13, wherein the confirm data is confirm of out of band authentication for Bluetooth pairing.

15. A device pairing method, for determining whether an identifying device should be paired with a candidate member device or not, the method comprising:
(a) establishing a connection between the identifying device and a first member device among at least one member device of a device set, to acquire a set ID and at least one identifying key from the first member device;
(b) discovering the candidate member device according to the set ID;
(c) generating identifying data according to the identifying key and transmitting the identifying data to the candidate member device;
(d) determining whether the candidate member device belongs to the device set or not according to a comparing result for the identifying data; and (e) pairing the identifying device to the candidate member device when the candidate member device belongs to the device set and not pairing the identifying device to the candidate member device when the candidate member device does not belong to the device set.

16. The device pairing method of claim 15, wherein the identifying key comprises set public keys respectively for each one of the member devices, wherein the step (c) comprises:
(f) acquiring a set public key of the candidate member device from the set public keys respectively for each one of the member devices; and
(g) generating the identifying data according to the set public key of the candidate member device.

17. The device pairing method of claim 16, wherein the step (g) comprises:
selecting a random number;
applying a specific function to generate confirm data according to a public key of the identifying device, a public key of the candidate member device, and the random number; and
encoding the confirm data and the random number by the set public key of the candidate member device to generate the identifying data.

18. The device pairing method of claim 17, wherein the confirm data is a confirm of out of band authentication for Bluetooth pairing.

19. The device pairing method of claim 15, wherein each of the member device comprises a set privacy key for the device set and the identifying key comprises the set privacy key, wherein the step (c) comprises:
(f) acquiring an encoded set public key of the candidate member device from the candidate member device;
(g) decoding the encoded set public key by the set privacy key to acquire a set public key of the candidate member device; and
(h) generating the identifying data according to the set public key of the candidate member device.

20. The device pairing method of claim 19, wherein the step (h) comprises:
selecting a random number;
applying a specific function to generate confirm data according to a public key of the identifying device, a public key of the candidate member device, and the random number; and
encoding the confirm data and the random number by the set public key of the candidate member device to generate the identifying data.

21. The device pairing method of claim 20, wherein the confirm data is confirm of out of band authentication for Bluetooth pairing.

* * * * *